United States Patent [19]

Jakob

[11] Patent Number: 4,630,677

[45] Date of Patent: Dec. 23, 1986

[54] FLUID RECOVERY SYSTEM

[76] Inventor: Paul G. Jakob, 7201 Venetian Way, West Palm Beach, Fla. 33406

[21] Appl. No.: 816,829

[22] Filed: Jan. 7, 1986

[51] Int. Cl.$^4$ .............................................. E21B 43/14
[52] U.S. Cl. ...................................... 166/68; 166/264
[58] Field of Search ................... 166/68, 68.5, 74, 264, 166/369, 54.1, 97.5

[56] References Cited

U.S. PATENT DOCUMENTS

| 3,103,813 | 9/1963 | Bourne, Jr. et al. | 166/264 |
| 3,109,376 | 11/1963 | Massey | 166/54.1 |
| 4,466,777 | 8/1984 | Kimberlin | 417/12 |
| 4,489,779 | 12/1984 | Dickinson et al. | 166/68 X |

FOREIGN PATENT DOCUMENTS 0104051  6/1982  Japan ............................. 166/68.5

Primary Examiner—Stephen J. Novosad
Assistant Examiner—Thuy M. Bui
Attorney, Agent, or Firm—Anthony A. O'Brien

[57] ABSTRACT

A system for recovering contaminating hydrocarbon fluid product from below ground includes water and product withdrawal pipes disposed within a well and connected to pumps adapted to remove water and product respectively. Admixture of the two fluids is precluded by the inclusion of a separator tube surrounding the water withdrawal pipe and having its bottom opening disposed well below the level of the fluid product. By locating the bottom intake of the water withdrawal pipe at a lower level than the bottom intake of the product withdrawal pipe and within a surrounding zone normally occupied by the product, hydrostatic pressure and the difference in specific gravity of the water and product insures separation of the product and water as the respective pumps individually remove same through the two pipes.

12 Claims, 1 Drawing Figure

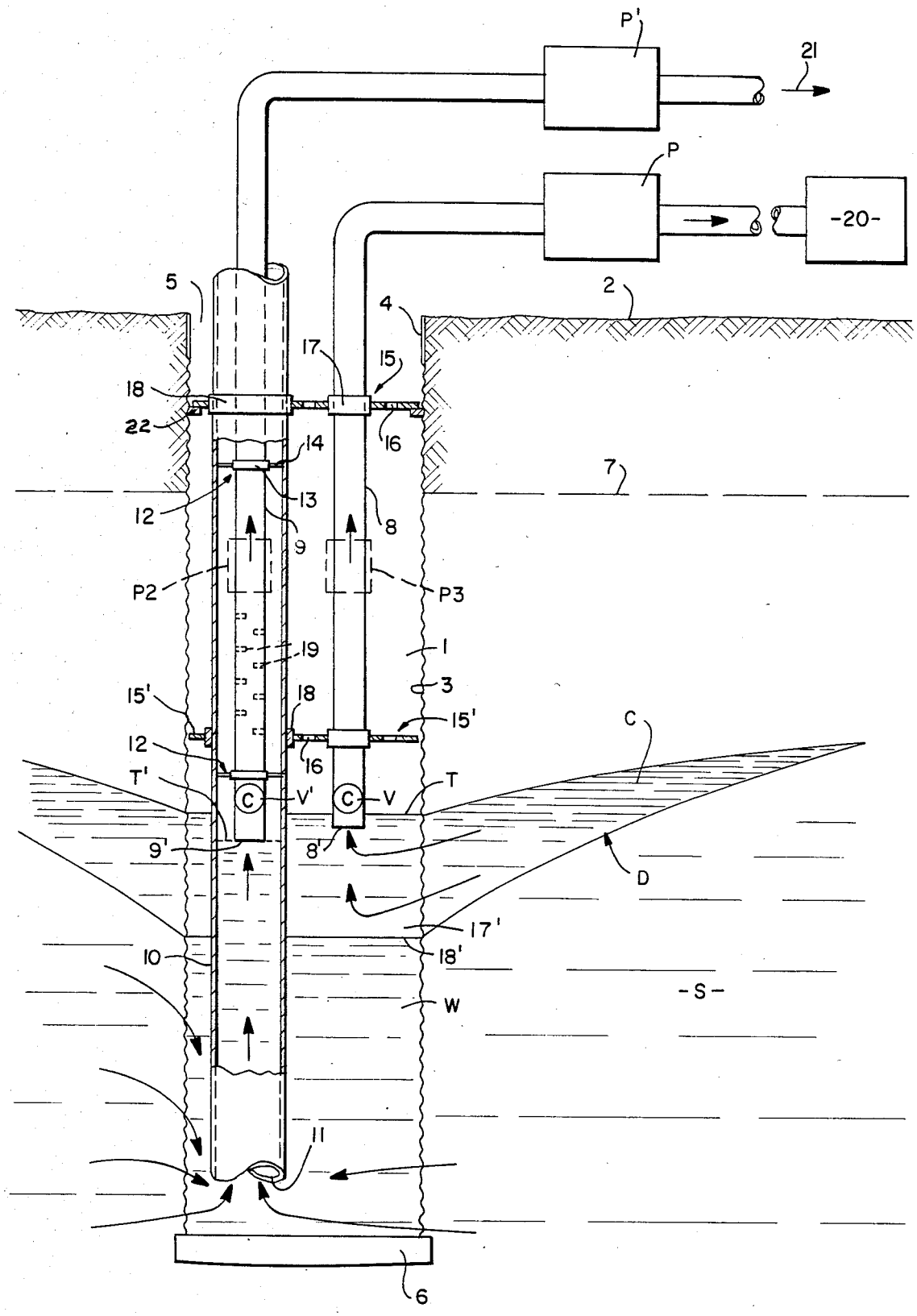

FLUID RECOVERY SYSTEM

BACKGROUND OF THE INVENTION

This invention relates generally to a well assembly and more particularly to an improved apparatus for recovering liquid products, including contaminants, from below ground level.

This systems is especially beneficial for recovering hydrocarbon products which have either leaked, spilled or seeped into the ground resulting in comtaminated soil and ground water. Environmental agencies are particularly concerned with the clean-up of such spills such as in the area of petroleum refineries, tank farms and even an individual automobile service station wherein a storage tank may have ruptured or is leaking.

Since the hydrocarbons exhibit a specific gravity less than that of water, the usual remedy for the recovery of these contaminants comprises the drilling of a well and the lowering of two pumps therein. Water is extracted by one of the pumps following which the surface of the water table developes an inverted cone shape surrounding the well bore. The subsurface contaminant seeks the lower level created by the depressed area of the center of this cone while disposed atop the heavier water. The other pump is operated to remove the accumulated column of contaminant disposed atop the water column within the well.

Prior efforts to accomplish the foregoing have comprised various assemblies including downhole pumps and electrical probes such as employed in the "Petropurge" system as produced by Nepcco. A further prior example is found in the apparatus as produced by Ejector Systems, Inc and which comprises a downhole vessel having a valved inlet permitting filling of the vessel with the surrounding fluid following which the vessel is pressurized to eject the fluid through a discharge pipe. Another example of a recovery system for below ground contaminants will be found in the patent to Kimberlin U.S. Pat. No. 4,466,777 dated Aug. 21, 1984 and which discloses the use of downhole pumps and electical probes.

By the present invention, an improved system is presented wherein a greatly simplified arrangement is provided not usually requiring the use of any downhole pumps, sensors or electrical probes and which is relatively inexpensive to construct, maintain and operate. This system utilizes the difference in the specific gravity of water and the petroleum product to separate the two fluids in the recovery well and individually withdraws each constituent as it accumulates in the zone of the depressed cone.

Accordingly, one of the objects of the present invention is to provide an improved product recovery system for subterranean fluids including a pair of withdrawal pipes extending into a well with their respective intakes disposed at different levels and with one of these pipes surrounded by a tube having its intake located at still a further lower level to provide for the separation of hydrocarbons from water within the well casing.

Still another object of the present invention is to provide an improved product recovery system for a well including a pair of withdrawal pipes having intakes each located within the zone of a fluid contaminant within the well with one of these pipes further surrounded by a separator tube having its intake located below the zone of the contaminant and wherein separate pump means respectively extracts water and contaminant through the two pipes.

A further object of the present invention is to provide an improved product recovery system inclding a plurality of pipes having their intakes disposed at a level within a zone of fluid contaminant within a well with one of the pipes serving to extract water from the lower reaches of the well and including stripping means within that pipe to enhance the removal of dissolved volatile contaminants by contact with air entrained within water being extracted through the water pipe.

With these and other objects in view which will more readily appear as the nature of the invention is better understood, the invention consists in the novel construction, combination and arrangement of parts hereinafter more fully described, illustrated and claimed with reference being made to the attached drawing.

BRIEF DESCRIPTION OF THE DRAWING

The single drawing FIGURE represents a side elevation, partly in section, of a product recovery system according to the present invention.

DESCRIPTION OF THE PREFERRED EMBODIMENTS

An example of the present invention will be seen to be illustrated in the drawing wherein a well has been constructed and includes a well hole 1 which will be understood to have been sunk a sufficient distance below the grade 2 to allow extension of the casing 3 a substantial distance below the present or anticipated normal water table. The casing 3 may include a solid or imperforate section 4 in the area adjacent the top well opening 5 but for reasons which will become obvious hereinafter, the majority of this casing 3 will be understood to comprise a perforated or screen construction and which may terminate in a well screen cap 6. The well and its casing is constructed to extend substantially below the static water or product level depicted by the line 7 as the present invention is designed to function in an area therebeneath which contains ground water contaminated with a fluid product such as hydrocarbons, the latter having a specific gravity of approximately 0.8.

The removal apparatus includes a product withdrawal pipe 8 and an adjacent water withdrawal pipe 9 each having a lower end or intake 8',9' respectively. These two pipe intakes will normally be positioned at a level substantially below the static water level 7 and are fixedly maintained in such a position by means to be described shortly hereinafter. A critical point is that the level of the product withdrawal pipe intake 8' is slightly higher than that of the water withdrawal intake 9'. The difference in these levels is preferably one-half (½) inch.

Surrounding the water withdrawal pipe 9 is a larger diameter, concentrically disposed separator tube 10 having a bottom intake or opening 11 located well below the level of the water withdrawal intake 9' and preferably one foot above the well screen cap 6. The positioning of the above described two pipes and tube is maintained by suitable means such as the illustrated spiders or supports 12 connecting the water withdrawal pipe 9 within the separator tube 10. Preferably, at least a pair of these spiders 12 are axially spaced apart and each may include a collar 13 surrounding the periphery of the water withdrawal pipe 9 and from which extend a plurality of radial legs 14 abutting the interior surface of the separator tube 10. The thus assembled pipe 9 and tube 10 are then in turn maintained in proper position with respect to the product withdrawal pipe 8 and well casing 3 by means of at least one suitable support plate 15 and spacer plate 15' axially spaced apart from one another within the well. Each plate 15—15' may comprise any substantially planar, circular member provided with appropriate openings 16 and cylindrical collars 17,18 for respectively engaging the periphery of the product withdrawal pipe 8 and separator tube 10. The support plate 15 is adapted to rest upon a protrusion or shoulder 22 fixed relative the well casing 3 while the lower spacer plate 15' serves solely to maintain the axial alignment of the downhole apparatus. The shoulder may comprise either a single annular ring or a plurality of circumferentially spaced members. Since the entire downhole assembly is intended to be retrievable from the surface, it follows that the lower spacer 15' must be capable of passing the upper shoulder 22. This may be accomplished by either forming the spacer 15' with a diameter adapted to pass the shoulder 22 or by providing notches in the spacer, arranged to clear the shoulder, when the latter comprises spaced individual members.

The upper reaches of the two pipes 8 and 9 respectively extend to a product pump P and water pump P'. During operation of this system, the water pump P' is actuated whereby ground water W disposed in the lower area of the well is drawn through the separator tube bottom opening 11 and subsequently through the intake 9' of the water withdrawal pipe 9. As replacement ground water migrates from the surrounding soil S through the well screen 3 into the well casing, and is likewise withdrawn as above described, an inverted cone or depression D is formed above the interface between the water W and product C as depicted in the drawing. This cone of depression D includes a central zone 17' comprising the lowest area of the inverted cone D with the product/water interface 18' being disposed lower than any other part of the product C contained either within the well hole 1 or the surrounding soil S.

With the foregoing arrangement in mind, it will be appreciated that upon operation of the product pump P, the contaminating fluid product C will be withdrawn from the body of this fluid contained in the central zone 17'. Check valves V,V' of any suitable construction are preferably included in each of the withdrawal pipes 8–9 adjacent their respective intakes and will be understood to readily allow upward displacement of fluid through the withdrawal pipes with a minimum of resistance. These valves are intended to aid in priming the pumps and facilitate the diffusion of air in the respective fluids being pumped. A typical valve would be of the spring-loaded plunger type.

With the above pipe and tube disposition, the hydrostatic pressure will be equal both inside and outside the bottom of the separator tube 10 when the pumps are not being operated. However, due to the lower specific gravity of the product C, its top surface T will reside at a higher level than that of the water level T' inside the tube 10. This relationship explains the disposition of the product withdrawal pipe intake 8' at a higher level than that of the water withdrawal pipe intake 9'. This level difference or head will be slightly less during pumping conditions and will equal the force required to move water from outside to inside the separator tube 10.

The advantages of the above described arrangement will be understood to rely heavily upon the separator tube 10. With the instant construction, the water W is substantially completely separated from all product C within the confines of the well 1. Since all water reaching the intake 9' of the water withdrawal pipe 9 has to enter the bottom opening 11 of the separator tube 10 at a level substantially below the body of product C, there is little chance for water and product contact during the migration of resident water and product to the positions as shown in the drawing. Contact between the product and water is minimized by maintaining a constant water level T' in the well during pumping. In this manner, there will be little if any rise or fall of the zone in the soil through which product flows toward the well, thus precluding new contact between product and water. Since product flows most easily through soils that are saturated with product and not soils containing air or remnant water in pore spaces, it follows that by maintaining a constant water level in the well, product recovery can be accomplished most efficiently and rapidly, with minimal further contamination of water by way of product and water contact.

The two pumps P—P' are preferably of the positive displacement type, powered by compressed air. Such pumps provide a nearly continuous suction, do not tend to loose their prime and are capable of providing the necessary suction to pull both water and air. This latter feature is important since during the withdrawal of water through the pipe 9, air under atmospheric pressure becomes entrained with the water moving upwardly within the pipe. Sometimes the water contains dissolved volatile contaminants which can be transferred to the air and thus air stripping of the withdrawn water is achieved. The present apparatus enhances this stripping action which may be additionally encouraged by the inclusion of a plurality of baffle elements or deflectors 19 within the water withdrawal pipe 9. Such baffles increase the surface area of the upwardly moving air and water to increase air-stripping.

Contaminant lifted by product pump P is subsequently directed to appropriate recovery means which may include a product storage or collector container 20 while water being extracted by the water pump P' is sent to any suitable area as indicated by the arrow 21 such as a distant dry well, storm drain etc.

Although the upper reaches of the two pipes 8 and 9 and the pumps P—P' are diagrammatically illustrated as disposed above the level of the soil grade 2, it will be understood that it is not necessary for any part of the present apparatus to project above grade level as the upper pipe portions and the pumps may be located in a trench. This alternative arrangement allows for use of the present invention in an area wherein dwellings or other structure preclude locating any portion of the pipes or pumps above ground.

These pumps P—P' are illustrated in a position which is adjacent the grade 2 but provision is made for alternate location of these pumps should the need exist. For example, if the water level were too far below grade to be withdrawn by suction, then the two pumps may be positioned down-hole within the well casing or screen 3 as depicted by the water pump P2 and product pump P3. The exact vertical disposition will be selected to insure positive suction lifting of the water and product from the existing fluid levels T' and T.

I claim:
1. A system for recovering a fluid product floating atop ground water comprising, a well having a well screen extending downwardly substantially below the static water and product level of the ground, a product withdrawal pipe and a water withdrawal pipe each provided with a bottom intake disposed within said well below said static level, an enlarged internal diameter separator tube surrounding said water withdrawal pipe and having a bottom opening disposed substantially below said water withdrawal pipe intake, said two pipes extending upwardly from said well to points adjacent grade level, a water and product pump respectively connected to said two pipes to separately withdraw water and product from said well respectively, said water pump operable to remove ground water from the lowest reaches of the well through said separator tube bottom opening and said water withdrawal pipe intake whereby, the static level of the ground water is lowered and forms an inverted cone of depression of ground water well below said pipe intakes with said product floating thereatop, said product accumulating as a central zone within said well and having a surface level normally no lower than said product withdrawal pipe intake, and said product pump operable to remove said product from said central zone.

2. A system according to claim 1 wherein, said two pumps are connected to said pipes adjacent grade level.

3. A system according to claim 1 wherein, said two pumps are connected to said pipes downhole and substantially below grade level.

4. A system according to claim 1 wherein, said water withdrawal pipe intake is disposed at a lower level than said product withdrawal pipe intake and operation of said pumps maintains the level of water within said separator tube at a constant level.

5. A system according to claim 4 wherein, the level of water within said separator tube is maintained at said water withdrawal pipe intake.

6. A system according to claim 4 wherein, said water withdrawal pipe intake is disposed substantially one-half inch lower than said product withdrawal pipe intake.

7. A system according to claim 1 including, a check valve within each said pipe adjacent its respective intake.

8. A system according to claim 1 including, means supporting and spacing said pipes and tube within said well and normally maintaining said intakes at levels within the body of said central zone.

9. A system according to claim 8 wherein, said supporting and spacing means includes at least two axially spaced-apart elements engaging said separator tube and product withdrawal pipe and radially extending to said casing.

10. A system according to claim 9 wherein, said two axially spaced-apart elements include an uppermost support plate and a lowermost spacer plate, a shoulder protruding inwardly from said well screen, and said support plate engaging said shoulder to support all downhole pipes and tubes of the system.

11. A system according to claim 9 wherein, said supporting and spacing means includes at least two axially spaced-apart elements engaging said water withdrawal pipe and radially extending to said separator tube.

12. A system according to claim 1 including, baffle means within said water withdrawal pipe to provide an increased area of surface contact and facilitate air-stripping as water is removed therethrough.

* * * * *